US006843976B2

(12) United States Patent
Allen et al.

(10) Patent No.: US 6,843,976 B2
(45) Date of Patent: Jan. 18, 2005

(54) REDUCTION OF ZINC OXIDE FROM COMPLEX SULFIDE CONCENTRATES USING CHLORIDE PROCESSING

(75) Inventors: Carole Allen, Pierrefonds (CA); Serge Payant, Pointe-Claire (CA); Peter Kondos, Montréal (CA); Gezinus Van Weert, Caledon East (CA)

(73) Assignee: Noranda Inc. (CA)

( * ) Notice: Subject to any disclaimer, the term of this patent is extended or adjusted under 35 U.S.C. 154(b) by 128 days.

(21) Appl. No.: 09/793,734

(22) Filed: Feb. 27, 2001

(65) Prior Publication Data

US 2002/0159927 A1 Oct. 31, 2002

(51) Int. Cl.[7] .......................... C01G 9/02; B01D 11/00
(52) U.S. Cl. .................... 423/622; 423/658.5; 423/659
(58) Field of Search ................. 423/109, 110, 423/150.1, 98, 27, 622, 658.5, 659

(56) References Cited

U.S. PATENT DOCUMENTS

| | | | | |
|---|---|---|---|---|
| 4,011,146 A | * | 3/1977 | Coltrinari et al. | 204/66 |
| 4,026,773 A | | 5/1977 | Van Peteghem | 204/108 |
| 4,054,638 A | * | 10/1977 | Dreulle et al. | 423/39 |
| 4,063,933 A | * | 12/1977 | Peters | 75/101 R |
| 4,082,629 A | | 4/1978 | Milner et al. | 204/66 |
| 4,192,851 A | * | 3/1980 | Hirsch et al. | 423/28 |
| 4,206,023 A | | 6/1980 | Au | 204/118 |
| 4,337,128 A | | 6/1982 | Haakonsen et al. | 204/107 |
| 4,346,062 A | | 8/1982 | Au | 423/109 |
| 4,362,607 A | | 12/1982 | Ritcey et al. | 204/108 |
| 4,378,275 A | | 3/1983 | Adamson et al. | 204/119 |
| 4,440,569 A | | 4/1984 | Weir et al. | 75/422 |
| 4,443,253 A | | 4/1984 | Weir et al. | 75/120 |
| 4,465,569 A | | 8/1984 | Bjune et al. | 205/606 |
| 4,505,744 A | | 3/1985 | Weir et al. | 205/608 |
| 4,510,028 A | | 4/1985 | Bolton et al. | 205/608 |
| 4,536,214 A | | 8/1985 | Ochs et al. | 75/101 |
| 4,545,963 A | | 10/1985 | Weir et al. | 423/26 |
| 4,568,525 A | * | 2/1986 | Beutier | 423/38 |
| 4,637,832 A | | 1/1987 | Cammi et al. | 75/109 |
| 4,671,945 A | * | 6/1987 | Thomassen et al. | 423/27 |
| 4,808,398 A | * | 2/1989 | Heistand, II | 423/622 |
| 4,818,503 A | * | 4/1989 | Nyman et al. | 423/10 |
| 4,832,925 A | | 5/1989 | Weir et al. | 423/141 |
| 5,089,242 A | * | 2/1992 | Dijkhuis et al. | 423/109 |
| 5,196,095 A | * | 3/1993 | Sudderth et al. | 204/106 |
| 5,380,354 A | | 1/1995 | Chalkley et al. | 75/743 |
| 5,869,012 A | | 2/1999 | Jones | 423/24 |
| 6,338,748 B1 | * | 1/2002 | Lee et al. | 75/725 |
| 6,395,242 B1 | * | 5/2002 | Allen et al. | 423/101 |

OTHER PUBLICATIONS

Craigen, et al., Conf. Proc. Sulphide Deposits, pp. 255–269, Jun. 1990.

* cited by examiner

*Primary Examiner*—Cam N. Nguyen
(74) *Attorney, Agent, or Firm*—Katten Muchin Zavis Rosenman

(57) ABSTRACT

An apparatus and a process for producing zinc oxide from a zinc-bearing material are provided. The process comprises the steps of leaching the complex sulfide material with hydrochloric acid, ferric chloride, and oxygen; precipitating iron from the leach solution using lime and oxygen; removing copper, silver, cadmium, cobalt and lead from the leach solution by cementation with zinc dust; precipitating zinc oxide from the leach solution using lime; and regenerating HCl from a calcium chloride leach filtrate solution to regenerate hydrochloric acid and precipitate gypsum. Related processes for recovering copper, silver, lead, and iron from complex sulfide materials and for recovering lead from residue by solubilizing lead chloride and precipitating it with lime are also provided.

29 Claims, 5 Drawing Sheets

REDUCTION OF ZINC OXIDE FROM COMPLEX SULFIDE CONCENTRATES USING CHLORIDE PROCESSING

BACKGROUND OF THE INVENTION

1. Field of the Invention

The present invention is concerned with the extraction and recovery of zinc from zinc-bearing materials through a process carried out in a chloride-based medium by chlorinating the metals followed by changing the medium and performing electrowinning in a conventional sulfate electrolyte. This process also allows for the recovery of precious and other metals. The present invention further relates to a process for producing zinc oxide from a complex sulfide material, an apparatus for performing the process, and processes for recovering iron, copper, silver, and lead from a complex sulfide material. More particularly, the invention relates to a process of producing zinc oxide from such a complex sulfide material by, preferably, a leaching of the sulfide material with hydrochloric acid and oxygen, followed by precipitation of iron from the leach solution using calcium oxide, and cementation of lead, copper, silver, cadmium and cobalt using zinc dust. Zinc oxide may then be precipitated from the leach solution using calcium oxide. The residual calcium chloride solution can then be treated with sulfuric acid to regenerate hydrochloric acid and produce gypsum.

2. Description of the Related Art

Use of chloride hydrometallurgy for the recovery of zinc from either complex sulfide ores or other metal-containing secondary materials offers many advantages over sulfate hydrometallurgical and pyrometallurgical processes. Concerns regarding the oversupplied market for sulfuric acid in North America and the shortage of conventional zinc concentrates have increased in recent years. Decoupling of zinc production from acid production and the processing of alternative feed materials offer a possible solution to these concerns. Gaining the ability to use a variety of zinc-bearing materials, such as difficult-to-process zinc concentrates or zinc containing wastes, has been the focus of numerous prior investigations. The recovery of precious metals from zinc concentrates and wastes, an unachievable task in some conventional electrolytic refineries, is another important objective.

Complex sulfide ores are characterized by a very high degree of mineral interlocking, and the enclosed minerals generally have small mineral grain size, making the production of saleable zinc and lead concentrates economically difficult or impossible using conventional mineral processing methods. Many deposits of this type are known and could be exploited if adequate processing technology were available.

The ferric chloride leach developed by Canmet (Craigen, W. J. S., Kelly, F. J., Bell, D. H. and Wells, J. A., Conf. Proc. Sulphide Deposits, pp. 255–69, June 1990, the contents of which are incorporated herein by reference) uses chlorine and ferric chloride to recover zinc from complex metal sulfides. A solution containing both zinc chloride and ferrous chloride is sent through a solvent extraction unit to remove iron and leave a clean zinc chloride solution, which is then sent to electrolysis to extract zinc and recover chlorine. However, this process is disadvantageous in that the cost of electrowinning zinc in chloride media is high compared to conventional sulfate electrowinning.

U.S. Pat. Nos. 4,378,275 and 4,536,214, the contents of which are incorporated herein by reference, provide a process for recovering zinc from complex sulfides. Complex sulfide ores are leached in autoclaves in one or two stages, and cupric chloride is the agent responsible for leaching zinc sulfide. The leach solution is purified by zinc dust cementation, and iron is removed by precipitation with MgO. Zinc is recovered by solvent extraction (i.e., loading di(ethylhexyl)phosphoric acid (DEHPA) and stripping by zinc sulfate electrolyte), followed by electrolysis. Recovery of reagents is accomplished by sending the resulting $MgCl_2$ leach solution to a spray roaster, where HCl and MgO are regenerated. This process involves multiple steps to produce a clean, organic-free electrolyte for a conventional zinc sulfate cellhouse. Furthermore, autoclaves are capital intensive, with limited use in chloride media involving oxidative solubilization.

U.S. Pat. No. 4,082,629, the contents of which are incorporated herein by reference, sets forth a process that uses an autoclave to leach lead concentrates. The lead recovery section recovers lead chloride from a leach residue by calcium chloride leach, and then the end product ($PbCl_2$) is sent to molten salt electrowinning.

In U.S. Pat. Nos. 4,337,128 and 4,465,569, the contents of which are incorporated herein by reference, a portion of the solution (a bleed) is treated with lime to precipitate zinc hydroxide. This product is contaminated with copper and iron hydroxide. The zinc hydroxide is separated from the solution and treated with $FeCl_2$ and oxygen to recover $ZnCl_2$ solution, which is purified and sent to zinc chloride electrowinning.

Additional processes have been used to extract metals from sulfide ores. In U.S. Pat. No. 4,026,773, the contents of which are incorporated herein by reference, a process for extracting metals, including zinc, from manganiferous ocean floor nodule ore is disclosed. The process comprises treating the ore with hydrochloric acid to produce a solution of the metal chlorides for further processing manganese dioxide by selectively extracting Fe, Cu, Ni, Co and Zn.

Similarly, in U.S. Pat. Nos. 4,206,023 and 4,346,062, the contents of which are incorporated herein by reference, zinc is recovered from materials containing zinc sulfide by partially chlorinating the zinc sulfide containing material in an aqueous medium.

U.S. Pat. No. 4,337,128 teaches a method of leaching sulfide-containing raw materials having metal sulfides of copper, iron, lead, silver, mercury and zinc. These raw materials are leached using a solution comprising cupric chloride and ferric chloride. The contents of U.S. Pat. No. 4,337,128 are incorporated herein by reference.

Copper and zinc are separated and recovered from aqueous chloride solutions containing lead, copper, zinc, and impurities in U.S. Pat. No. 4,362,607, the contents of which are incorporated herein by reference.

The contents of the following patents are also incorporated herein by reference: U.S. Pat. Nos. 4,440,569; 4,443,253; 4,505,744; 4,510,028; 4,545,963; 4,832,925; and 5,380,354. In these seven patents, zinc is recovered from zinc containing sulfidic materials that also contain iron and lead or silver by leaching the sulfidic material under oxidizing conditions.

Zinc may also be extracted from a sulfide ore or concentrate containing copper and zinc by subjecting the concentrate to pressure oxidation in the presence of oxygen and an acidic halide solution to obtain a pressure oxidation slurry, as shown in U.S. Pat. No. 5,869,012, the contents of which are incorporated herein by reference. This slurry is then subjected to a solid/liquid separation step to produce a liquor containing copper and zinc in solution.

Methods of purifying aqueous zinc solutions by using zinc dust to cement out impurities are also known. U.S. Pat. No. 4,637,832, the contents of which are incorporated herein by reference, discloses a method of cementing out impurities such as copper, cadmium, nickel, and cobalt from an aqueous solution of zinc sulfate by using zinc dust and an activator such as Cu—As or Cu—Sb.

It is desirable to develop a process for producing zinc oxide from complex concentrates of sulfide materials that is easy to perform and cost-effective. None of the above-mentioned techniques addresses a process of producing a clean zinc oxide that overcomes the problems noted above.

SUMMARY OF THE INVENTION

It is an object of the invention to provide an apparatus for producing zinc oxide from a complex sulfide material. The apparatus comprises a leaching unit for leaching the complex sulfide material with hydrochloric acid, ferric chloride and oxygen, a first precipitating unit for precipitating iron from the leach solution using lime (or secondary zinc bearing materials), and removing lead, copper, silver, cadmium and cobalt from the leach solution by cementation with zinc dust. A second precipitating unit is used to precipitate zinc oxide from the leach solution using lime. The residual calcium chloride solution is then treated to regenerate hydrochloric acid and precipitate gypsum.

A further object of the present invention is to provide a process for producing zinc oxide from a complex sulfide material. The process comprises the steps of leaching the complex sulfide material with hydrochloric acid and oxygen, precipitating iron from the leach solution using lime (or secondary zinc bearing materials), cementing lead, copper, silver, cadmium and cobalt in the leach solution with zinc dust, and precipitating zinc oxide from the leach solution using lime. The residual calcium chloride solution is then treated to regenerate hydrochloric acid and precipitate gypsum.

Still another object of the present invention is to provide a process for recovering copper, silver, and lead from a complex sulfide material. The process comprises the steps of leaching the complex sulfide material with hydrochloric acid and oxygen, precipitating iron from the leach solution using lime or secondary zinc, and recovering lead, copper, silver, cadmium and cobalt from the leach solution by cementing with zinc dust.

A further object of the present invention is to provide a zinc oxide precipitate that is substantially free of contaminants by leaching a complex sulfide material with hydrochloric acid and oxygen. Iron is precipitated from the leach solution using lime or secondary zinc, and copper, silver and lead are cemented from the leach solution using zinc dust. Zinc oxide is precipitated from the leach solution using lime.

Another object of the invention is to provide a process for recovering lead from a leach residue. The process includes the steps of solubilizing lead chloride and precipitating the lead chloride by neutralization with lime, thereby causing lead hydroxychloride to precipitate, and destabilizing the lead hydroxychloride by subjecting it to high pH and temperature, thereby reducing the chloride content of the product.

The invention is described in more detail below with reference to the accompanying figures.

DESCRIPTION OF THE PREFERRED EMBODIMENTS

The process of the present invention aims to recover Zn, Ag, Cd, Cu and Pb from mineralogically complex sulfide concentrates and other zinc-bearing materials. The $HCl/O_2$ leach process of the present invention results in the extraction of valuable metals (e.g., Zn, Ag and Pb) from a low-grade complex material, such as concentrate produced from an ore body of complex sulfides. In one example, metal concentrations of the typical concentrate used are: 17.0% Zn, 2.14% Pb, 0.21% Cu, 123 g/t Ag and 32.8% Fe; however, the process is not limited to this composition. The process allows for the on-site treatment of low-grade material, resulting in the production of an iron-free and sulfur-free zinc oxide that can be shipped to an electrolytic zinc refinery, thereby reducing transportation and residue disposal costs. Alternatively, the zinc oxide produced could be sold directly to customers.

The chloride process of the present invention may be used on zinc ferrites (from zinc process residues), on Electric Arc Furnace (EAF) and Basic Oxygen Furnace (BOF) dusts, or any other zinc-bearing materials of this nature.

In the present invention, all leach solution is purified through first iron precipitation and then by zinc cementation. The conditions are subsequently adjusted to produce a zinc oxide precipitate free of impurities, which is the final product of the process.

Figure 1:
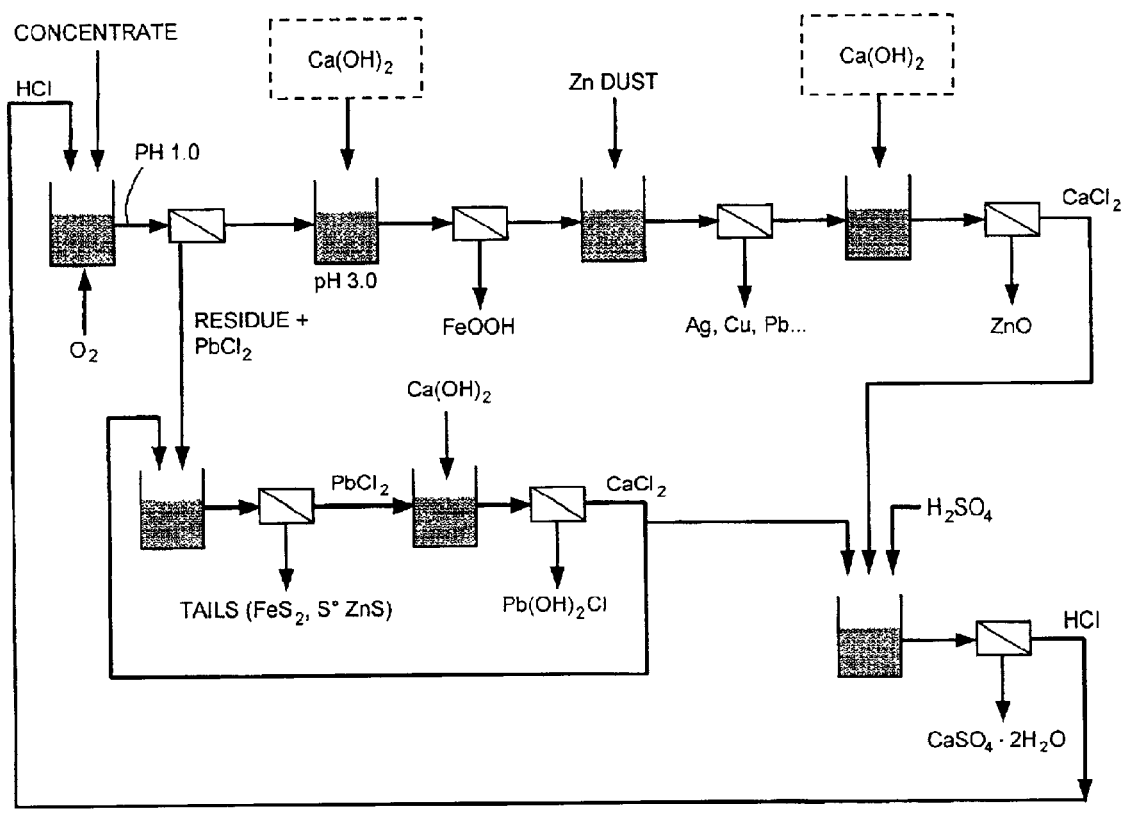
FIG. 1 is a diagram illustrating a preferred embodiment of a process for producing zinc oxide from a complex sulfide material using chloride processing.

In a preferred embodiment, a process according to the present invention comprises a series of steps, as will be described in detail below. The process is illustrated by the flow diagram of FIG. 1.

Leaching and Acid Neutralization

The first step involves leaching a mineralogically complex sulfide concentrate using hydrochloric acid and oxygen. In order to achieve a highly selective leach of zinc over iron, concentrated hydrochloric acid is used and the redox potential of the slurry is controlled. The sulfide concentrate used in the reaction typically involves a low-grade material, and in one example, the metal concentrations present in the concentrate are approximately 17% by weight zinc, 2.14% lead, 0.21% copper, 123 g/ton silver, and 32.8% iron. In one tested case, the feed material was a processed zinc ore tailing which formed a low-grade zinc concentrate of complex metal sulfides such as pyrite, sphalerite and galena. Operating conditions of the $HCl/O_2$ leaching system have established a highly efficient, selective, redox-potential-controlled process with Zn extraction at 90%–94%, with iron extraction limited to 0.15 ton Fe/ton Zn and sulfide sulfur transformed mostly into elemental sulfur. The chemical system applied in leaching involved the use of hydrochloric acid and oxygen gas. The principal reactions occurring during leaching are as follows (solid phases are shown in bold):

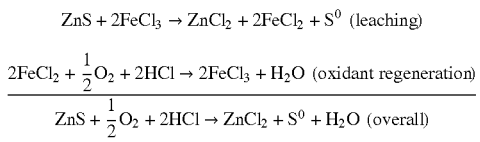

$$ZnS + 2FeCl_3 \rightarrow ZnCl_2 + 2FeCl_2 + S^0 \text{ (leaching)}$$

$$2FeCl_2 + \frac{1}{2}O_2 + 2HCl \rightarrow 2FeCl_3 + H_2O \text{ (oxidant regeneration)}$$

$$\overline{ZnS + \frac{1}{2}O_2 + 2HCl \rightarrow ZnCl_2 + S^0 + H_2O \text{ (overall)}}$$

Similar reactions take place for other sulfide minerals, such as pyrite, galena, and pyrrhotite, which are present in the concentrate. Ferric ion ($Fe^{3+}$) is the oxidant, while cupric ions ($Cu^{2+}$) act as catalysts for the ferrous-to-ferric oxidation process. The iron required for the leach is provided by soluble iron species present in the concentrate (e.g., pyrrhotite). Copper addition is required for the bench-scale batch tests, but it is not needed for continuous plant operation, if copper is consistently supplied through dissolution of minor amounts of chalcopyrite present in the feed.

Leaching of the complex metal concentrate with HCl and $O_2$ is performed under the following conditions: a) batch leach duration of 7 hours at 95° C., b) initial HCl concentration of 6 N, c) stoichiometric amount of HCl added reaches 130%, based on Zn, Pb and Cu present in the concentrate, d) addition of Cu in the initial leaching solution at approximately 1.0 g/l, e) $O_2$ flow rate of 200 ml/min (i.e., 0.06 ton $O_2$/ton conc.) to maintain a 400 mV oxidation-reduction potential (ORP) (versus Ag/AgCl), f) initial pulp density of 400 g/l. When the slurry ORP drops to 200 mV, copper precipitates, resulting in a reduction in the rate of ferrous-to-ferric ion oxidation and diminished sphalerite (ZnS) dissolution. The elevated initial HCl concentration (i.e., 6 N) used in these batch tests would be significantly lower and constant in a continuous operation.

The leaching process described above may be performed as a single step leach with one addition of HCl to the solution, or as a continuous leaching process performed with multiple additions of HCl.

Although the leach may be performed at the conditions described above, the present invention is not to be limited to these conditions. The leaching step may be carried out at a temperature from about 50° C. to about 150° C., more preferably from 85° C. to 100° C., with 95° C. being the optimum temperature for the leach solution. The redox potential of the leach solution is controlled by oxygen and/or concentrate addition, and the effective redox potential of the solution may range from 250 mV to 600 mV, and more preferably from 350 mV to 400 mV. The preferred pH of the leach solution is low, and ideally it is less than 1.0. The retention time for the leaching step may range from 4 to 12 hours, although 7 hours is the preferred retention time. The concentrations of zinc and iron present in the leach solution are preferably about 50 g/l to 130 g/l and 20 g/l to 25 g/l, respectively. A key advantage provided by this step of the process according to the present invention is the selectivity for zinc over iron.

Zinc extraction easily reaches 94% extraction and lead consistently approaches 95% extraction, while copper and silver exceed 85% extraction. Whereas the feed material contains 1.9 ton Fe/ton Zn, iron extraction is limited to 0.15 ton Fe/ton Zn and sulfide sulphur is gradually transformed into elemental sulfur, resulting in a very low sulfate content of 0.05 ton $SO_4^{2-}$/ton Zn.

The use of air instead of $O_2$ results in a low overall Zn extraction (i.e., about 70%), and also considerably reduces the Zn extraction rate. Use of $O_2$ allows the complete leaching of twice the quantity of concentrate as is possible with air. It is within the scope of this invention to use other oxidizing agents in place of oxygen. Furthermore, increased oxygen flow rates accelerate Zn dissolution and improve overall extraction, although the rate of oxygen consumption can become prohibitively high because most of the oxygen passes through and is vented out if the reactor design is not optimized for oxygen recirculation.

The excess HCl that is not utilized during the leaching step is consumed by adding more sulfide concentrate while sparging oxygen or another oxidizing agent. The concentrate addition is stopped when the pH reaches approximately 3.0, so as to neutralize the acidity to minimize the consumption of neutralizing agent later on in the process. While filtration and thorough washing are required for solid/liquid separation following primary leaching (e.g., see FIG. 1), the use of a thickener after acid consumption is sufficient. It is noted that the process of leaching and neutralizing acid may be carried out in a countercurrent mode by recycling all solids that were not totally dissolved during acid neutralization back through the leaching process. Conducting the leach countercurrently allows all of the metal value that was not completely dissolved during acid neutralization to be recovered.

This acid neutralization step is carried out under reaction conditions similar to those set forth above with respect to the primary leaching process, although the preferred pH range is 0.5 to 1.0. The preferred concentrations of iron and zinc in the leach solution are 20 g/l to 30 g/l and 80 g/l to 150 g/l, respectively. Any solids remaining after the acid neutralization step are recycled to the primary leach.

Lead Recovery

Large grains of free $PbCl_2$ have been observed in leach residues, due to the secondary precipitation of dissolved lead, which forms $PbCl_2$ precipitates in weak chloride media. The solubility of $PbCl_2$ is significantly reduced by decreasing the temperature during filtration of the leach residue from the initial 85° C. to a leach solution temperature of 100° C. This precipitation can be reversed to recover lead by repulping the leach residue at 95° C. with a high strength calcium chloride solution, or a mixture of chlorides in solution, to increase lead chloride solubility. This is followed by filtration and precipitation of Pb(OH)Cl by the addition of lime. Periodically, a bleed of the lead-depleted solution has to be removed for impurity control, and should be sent to the hydrochloric acid regeneration unit. The lead hydroxychloride may be subjected to further treatment to remove chlorides if required. For instance, the product may be destabilized by being put into hot water (about 95° C.) having an adjusted pH of about 9.5. The chloride content is then substantially reduced. Alternatively, the lead hydroxychloride may be calcined to prepare a product with reduced chloride content. The $PbCl_2$ may optionally be crystallized and shipped to a lead refinery for recovery.

Iron Precipitation

In this step, iron and other impurities are precipitated from the leach solution filtrate obtained in the leaching step using lime or secondary zinc material. The reagent acts as a neutralizing agent, and causes iron to precipitate from the solution as akaganeite (i.e., FeO(OH),Cl), leaving less than approximately 0.4 mg Fe/l in solution.

Oxygen is sparged through the leach solution filtrate to oxidize and precipitate iron. The remaining iron is then removed by adding lime, as slaked lime or even as 100% solid, although other compounds such as ZnO, oxidized zinc ore, EAF dust, NaOH, $Na_2CO_3$, and $CaCO_3$ may also be used as precipitating agents. The purity of the reagent used is not critical, therefore, a low quality product may be added. Lower-purity reagent may also be added as a make-up for lost reagents. A set of iron precipitation reactions is written below:

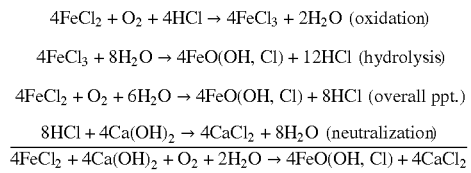

Soluble copper is also important in carrying out the reaction because of its catalytic effect on ferrous ion oxidation in acidic solutions. As already stated, adding copper may be required if the copper content of the feed material is too low. Maintaining the slurry ORP over 200 mV (versus Ag/AgCl) is essential to keep copper in solution.

During the precipitation of iron, other elements such as arsenic, aluminum, chromium, germanium, selenium, tellurium and antimony are completely removed. Some copper and lead are also precipitated during this part of the process, but not to completion (generally, about 1.5 g/l Pb remains in solution after iron precipitation). Lead precipitates as PbO, $PbO_2$ or Pb(OH)Cl, according to the following chemical reactions:

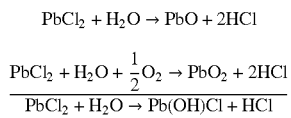

After filtration, the $ZnCl_2$ solution contains Cu, Bi, Ni, Co, Cd, Pb, Tl and Ag, all of which can be removed by cementation with Zn dust. Elements such as Mg, Na, Mn, Ca, K and Si will not be removed. The iron precipitate, which consists of mostly iron oxide, is filtered and washed prior to disposal. Wash water requirements are about 1.2 ton/ton dry residue with a wash efficiency of 90% for this specific feed. However, some loss of chloride is expected with the iron residue. The use of coagulants is expected to improve this washing operation.

For the proposed neutralization process to be economical, a low magnesiun and sodium content alkaline material is required. Common alkalis such as caustic soda will cause build-up of sodium ions in solution that must be bled from the process. The use of low-magnesium-content lime resolves this issue, due to the recycling option. Following ZnO precipitation, the concentrated $CaCl_2$ solution is subjected to treatment with sulfuric acid in the hydrochloric acid regeneration unit, where HCl is regenerated and re-utilized. Using the same unit, gypsum of market-suitable purity may be precipitated. As an alternative to lime, the use of zinc-oxide-containing material sources from pyrometallurgical processing is an option. Metallurgical dusts may contain a portion of zinc ferrite ($ZnO.Fe_2O_3$), which effectively have no neutralizing ability in the pH range of interest. At a pH of 3, in a hot zinc chloride brine, it has been found that less than 0.1% of the iron from the ferrite will solubilize. This finding supports the selective dissolution of zinc. Still another alternative is to use a zinc oxide ore as a reagent for the neutralization.

The efficiency of $Ca(OH)_2$ in causing the precipitation of Fe, Cu, Pb, and Al was calculated to be 95%, 84%, and 96% at pH values of 3.0, 3.5, and 4.0, respectively. The pH range over which this step of the process may be conducted is from 2.5 to 5.0, with 2.5 to 3.5 being the preferred final pH of the solution. The precipitation step is carried out at from 50° C. to 108° C., with 90° C.–95° C. being the preferred solution temperature range. This step should be carried out over a period of about 30 minutes to 4 hours, with a preferred retention time of 2 hours. The consumption of $Ca(OH)_2$ is about 0.2 t per t of Zn treated. The filtrate from this step is sent to cementation.

Cementation

Copper, silver, and lead are recovered from the impure leach solution filtrate by cementation with zinc dust. Zinc dust is added in an amount equivalent to between 50% and 350% of the stoichiometric concentrations of these metals present in the leach solution. In addition to the above-mentioned metals, cadmium and cobalt may also be removed from the impure leach solution filtrate.

The pregnant leach solution, heated to 90° C. and now purified of iron and other contaminants, is contacted with zinc dust to remove lead, silver and copper into a saleable silver-bearing precipitate. The amount of zinc dust needed is approximately 50%–350% of the stoichiometric amount required to cement Cu+Pb+Ag, while minimizing contamination of the cement cake with cadmium. Adjusting the zinc dosage will lead to a cementation cake containing from 1% to 90% Ag. Any non-alkali and non-earth-alkali metal remaining in solution after cementation will be present in the ZnO precipitate, and can likely be handled more economically at a zinc refinery. A relatively pure zinc chloride solution is obtained after cementation, and can be further purified if required.

The cementation step described above may be carried out at a pH range of from 2.8 to 4.0, although a pH of 3.0 is preferred. The temperature of the solution may range from 50° C. to 100° C., but 90° C. is the preferred temperature for cementation. Although it is stated above that it is preferred that from 50% to 350% of zinc powder be added according to the stoichiometric amounts of Cd, Cu, Pb, Ag, and Co present in solution, it is possible to utilize from 50% to 1000% zinc dust based on the amount of these metals present. The silver content in the cementation cake increases from 0.01% to 40%. The retention time for performing this step of the process according to the present invention should be at least 20 minutes.

It should also be noted that although the cementation step is described above as a single stage, it is possible to use two or more stages in the cementation step. When multi-step cementation is used, it is possible to obtain cementation cakes having different compositions. The first cake typically contains silver and copper, the second may contain cadmium, cobalt and lead, and the third cake likely would contain cadmium, cobalt and other impurities. Such a multi-step cementation allows better separation of the desired metals, facilitates further processing, and may raise economic returns.

Zinc Oxide Precipitation

The process according to the present invention also requires precipitating zinc oxide from the zinc chloride solution, which has a concentration of from 0.5 to 3.0 M $ZnCl_2$ and is obtained after the initial steps of the process, using lime for the precipitation. The addition of lime is stoichiometric to the concentration of zinc present in the leach solution, so as to cause all or most of the zinc present in the leach solution to precipitate in one step. The pH is controlled between 6.5 and 11 during this step, preferably between 7.5 and 8.5, and the temperature of the solution may be in the range from 50° C. to 100° C., but the preferred temperature is 90° C. Nearly 100% of the zinc present in the leach solution is precipitated as zinc oxide upon addition of the lime slurry. The lime used for this precipitation step should be of a high quality, as all impurities that it may contain will likely remain in the end product or in the recycled solution. The precipitated product is then washed to remove any entrained calcium chloride solution. The final concentration of zinc in solution may be as low as 2 mg/l.

The zinc oxide is dried and shipped to a zinc refinery to be added in the leach or Jarosite as a neutralizing agent, or redissolved in electrolyte, purified using zinc dust, and processed through zinc sulfate electrowinning. The zinc oxide precipitate contains approximately 70%–75% zinc, and preferably has a chloride content of less than 0.05%, and a calcium content of approximately 6% present as impurities. This level of purity facilitates the integration of this product in the conventional electrolytic zinc refining process.

Lime as the neutralizing reagent results, theoretically, in the following reactions:

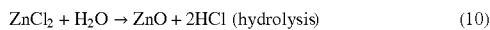
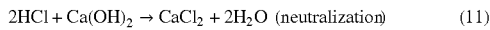
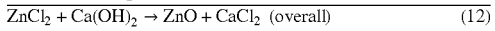

$$ZnCl_2 + H_2O \rightarrow ZnO + 2HCl \text{ (hydrolysis)} \quad (10)$$
$$2HCl + Ca(OH)_2 \rightarrow CaCl_2 + 2H_2O \text{ (neutralization)} \quad (11)$$
$$ZnCl_2 + Ca(OH)_2 \rightarrow ZnO + CaCl_2 \text{ (overall)} \quad (12)$$

This series of reactions represents a conventional neutralization process with the objective of generating a ZnO product of high purity.

Stability diagrams of zinc solutions containing chloride ions have been developed by Dr. Ton van Sandwijk (Delft University of Technology) using thermodynamic principles, with an attempt to include kinetics with the addition of the metastable zone of the zinc hydroxychloride to the basic zinc oxide precipitation diagram.

Figure 2:
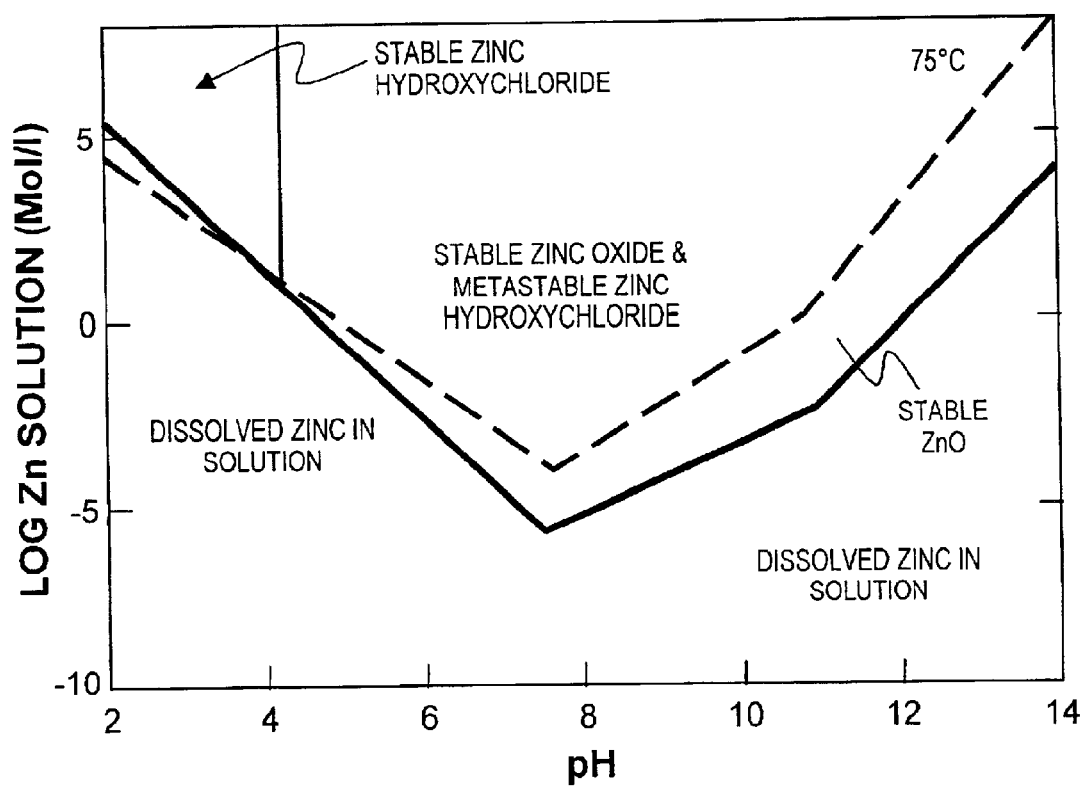
FIG. 2 is a graph showing the thermodynamically and kinetically predicted optimum conditions for production of a high quality zinc precipitate according to the present invention.

FIG. 2 illustrates the region of high quality precipitate, the stable ZnO region, which lies between the solid line and the dashed line. At a temperature of 75° C., the region is largest in the pH range of 8 to 11, which appears to be inside the useful window offered by lime as a neutralizing agent. With $Ca(OH)_2$ as a neutralizing agent, a direct neutralization could be effected. Furthermore, the neutralization can be carried out at an even higher pH where zinc oxide is more stable.

The ZnO product is generated through a primary precipitation by lime slurry in which all of the zinc content in the solution is precipitated as zinc oxide, followed by washing this product to remove entrained $CaCl_2$. Following a solid/liquid separation, this product is dried before shipment if desired, while the clarified, concentrated $CaCl_2$ solution is directed into the hydrochloric acid unit for regeneration and recycling of HCl and precipitation of calcium sulfate (i.e., calcium sulfate dihydrate: gypsum, calcium sulfate hemihydrate, or plaster of Paris). This approach generates an iron-free ZnO product containing around 75% Zn, which is low in Cl (i.e., 0.05% or less) and Ca (i.e., 6% or less).

Zinc Sulfate Electrolysis

The ZnO product obtained according to the present invention could be introduced in a new dedicated zinc refinery, or it could be introduced in an existing plant circuit with provisions for increasing plant capacity through full operation of a cellhouse. Impurity tolerance (e.g., Cl content) in ZnO is higher if the second approach is implemented. ZnO dissolution in spent electrolyte is rapid (less than 10 minutes is required) and can be carried out easily at room temperature. An increase in the zinc content present in solution from about 57 g/l to about 100 g/l results in a temperature increase. Higher zinc concentrations can be desirable if a cementation step is to be carried out in sulfate media. A Mg content of 1.0% in the ZnO feed is acceptable, although lower concentrations are more desirable. The reference limit for Cl⁻ in the electrolyte should not be exceeded, otherwise, chlorine could evolve at the anode.

Figure 3:
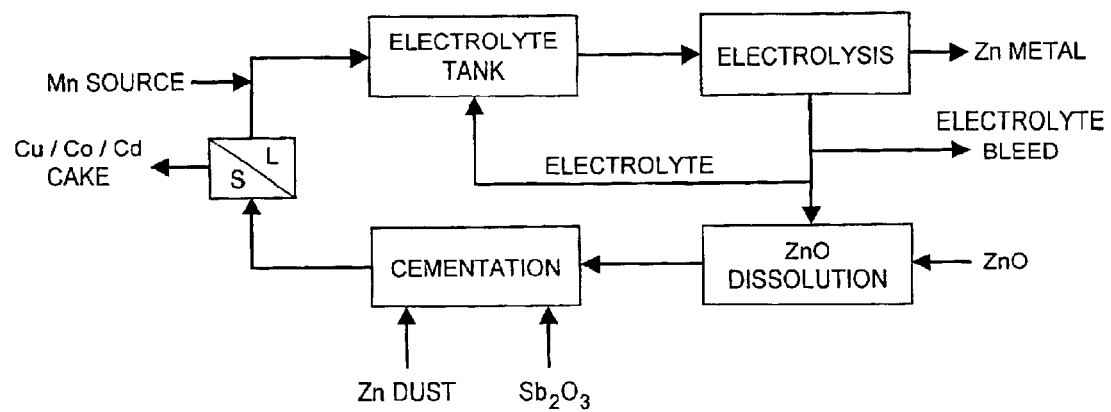
FIG. 3 is a block diagram that shows an example of how a zinc refinery might process the zinc oxide feed material produced according to the present invention.

In one example, electrowinning with aluminium cathodes and lead-silver anodes may be carried out on the reconstituted electrolyte at 400–600 A/m² and 38° C. FIG. 3 shows how a zinc refinery may process this feed material. To allow for a conventional cellhouse to operate with lead-silver anodes, a manganese compound should be introduced into the electrolyte. In order to take advantage of the lack of manganese in the electrolyte, in a dedicated refinery, dimensionally stabilized anodes (DSA) or other advanced anodes may be used.

Hydrochloric Acid Regeneration Unit

Following ZnO precipitation, the concentrated $CaCl_2$ solution is subjected to sulfuric acid treatment, where HCl is regenerated for re-utilization in the process according to the present invention. This is accomplished by contacting the calcium chloride solution with sulfuric acid to precipitate gypsum and regenerate hydrochloric acid. The calcium concentration may vary from 80 g/l initially to 0.3 g/l. However, the process is not limited to those concentrations. The regeneration occurs very quickly. After a solid/liquid separation, the solution may be sent back to the leach to be reused. The bleed solution from the lead precipitation may also be treated in this unit, thereby maximizing chloride utilization.

The remaining calcium chloride leach solution is treated with sulfuric acid in the hydrochloric acid regeneration unit in order to regenerate hydrochloric acid and precipitate a calcium product (i.e., calcium sulfate dihydrate: gypsum, calcium sulfate hemihydrate, or plaster of Paris). Conditions of this precipitation may be adjusted to prepare product suitable for the market. Calcium chloride is present in the solution at approximately 220 g/l. This optional recycling step improves the cost-efficiency of the process.

Summary

Under ideal operating conditions, the hydrochloric acid and oxygen leaching system described above is highly efficient, highly selective, and redox potential-controlled. The typical range for the amount of zinc extracted from a sulfide concentrate is from 90% to 94%. Iron extraction according to the present process is limited to 0.15 ton Fe/ton Zn. Furthermore, during leaching, the sulfur present as sulfide is mainly transformed into elemental sulfur.

The previously described chloride process is especially beneficial for use in the processing of complex sulfide ores, secondary materials, zinc oxide ores, and as an add-on technology for processing flotation tailings in complex sulfide ores, although it is not limited to these uses. Furthermore, numerous potential process improvements and modifications may be conceived that will improve performance and improve cost efficiency. These improvements are considered to be within the scope of the present invention.

Figure 4:
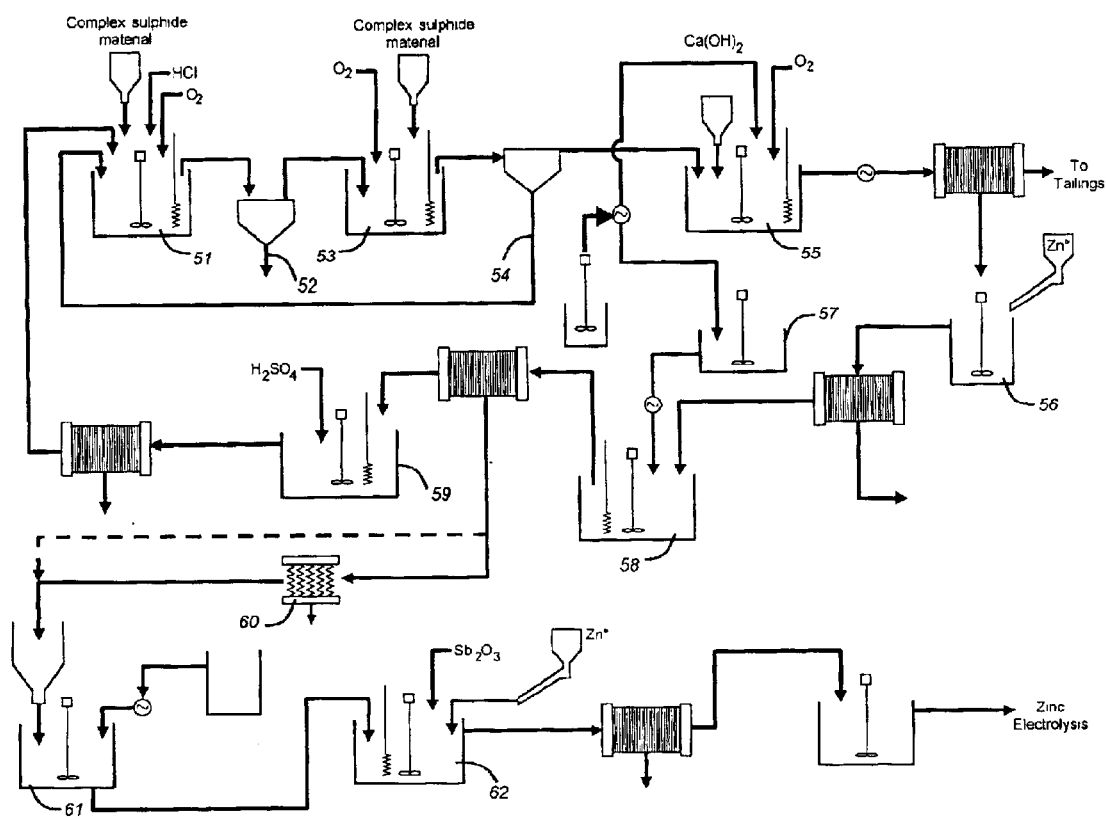
FIG. 4 is a diagram illustrating a preferred embodiment of an apparatus for producing zinc oxide from a complex sulfide material using chloride processing.
Figure 5:
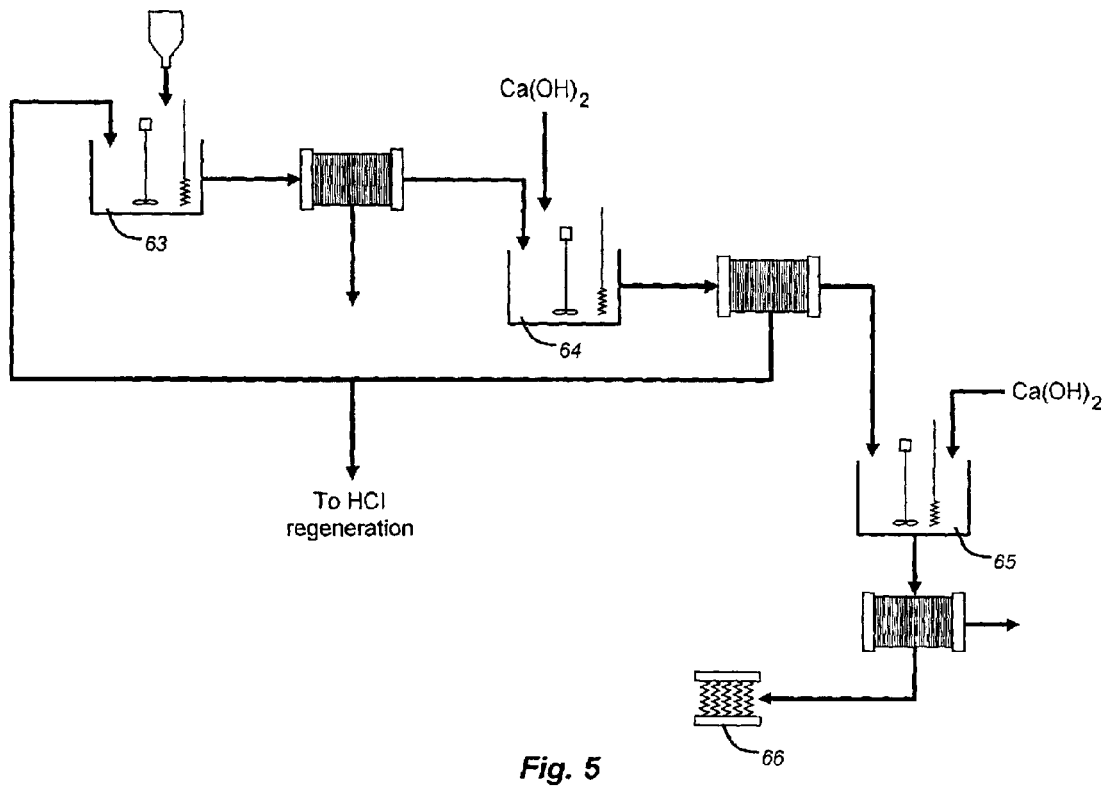
FIG. 5 is a diagram illustrating an apparatus for lead chloride solubilization, precipitation of lead hydroxychloride, and destabilization leading to a lead compound.
Figure 6:
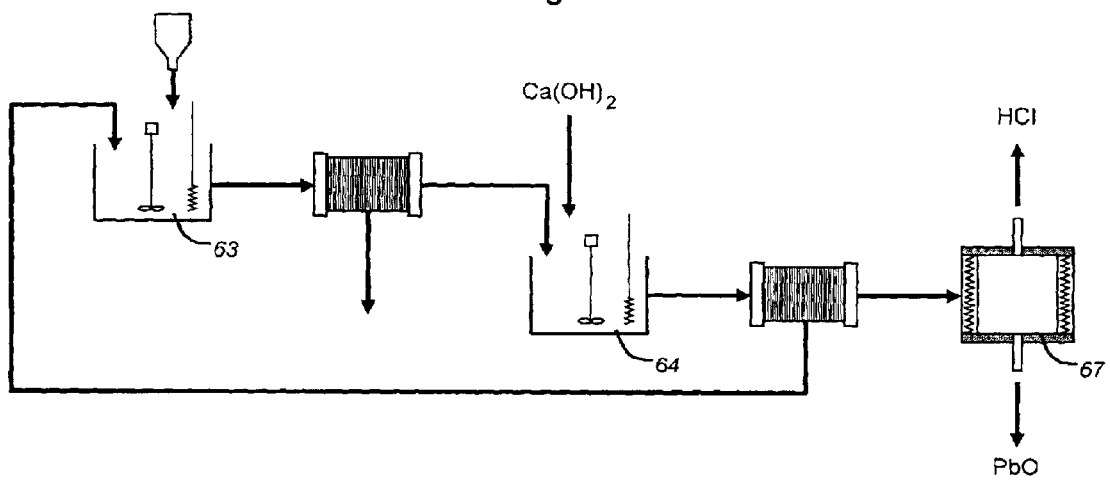
FIG. 6 is a diagram illustrating an apparatus for lead chloride solubilization, precipitation of lead hydroxychloride, and calcination leading to a lead compound.

An apparatus for carrying out the process of the present invention will now be described with reference to FIG. 4. A complex sulfide material is added to leaching unit 51, where leaching occurs using HCl, ferric chloride and $O_2$. The pulp is transferred to a solid/liquid separation unit and the solids 52 are sent either to an apparatus as shown in FIG. 5 or an apparatus as shown in FIG. 6. The filtrate is further treated by an acid neutralization unit 53 by addition of more feed material and oxygen. The pulp is transferred to a solid/liquid separation unit and solids 54 are recycled back to the first leaching unit 51. The filtrate, which contains aqueous zinc compounds, is then sent to a first precipitating unit 55, where iron is precipitated from the leach solution using calcium hydroxide, calcium oxide, zinc oxide ore, or another precipitating agent. The solution, after a solid/liquid separation step, may then be sent to a cementation unit 56, where dissolved metals such as copper, silver, lead, cadmium, and cobalt are cemented using zinc dust. The solution, after a solid/liquid separation step, is then treated in a second precipitating unit 58, where zinc oxide is precipitated from the leach solution using a lime slurry prepared in unit 57. In this step, all of the zinc content of the zinc chloride solution is depleted (i.e., the zinc concentration is reduced from about 85 g/L to about <0.1 g/L), and a zinc oxide precipitate having a low calcium content is produced. This step is preferably carried out at a temperature of about 95° C. The zinc-depleted solution is sent to unit 59 where sulfuric acid is added and hydrochloric acid will be regenerated and calcium sulfate will be precipitated. This hydrochloric acid will then be sent back to leaching unit 51. The wet zinc oxide may then be dried in unit 60. The zinc oxide may optionally be sent to a zinc oxide purifying unit 61 for redissolution in spent sulfate electrolyte. The zinc sulfate solution may also be purified using zinc dust in unit 62, and $Sb_2O_3$ may optionally be added as an activator to improve cobalt cementation. The zinc sulfate solution may be sent to a retention tank, and may then be subjected to zinc sulfate electrowinning.

The apparatus for recovering lead will now be described in reference to FIGS. 5 and 6. The leach residue containing lead chloride is sent to unit 63 where it is dissolved by a high chloride content salt solution (6 N or more) and high temperature, preferably about 95° C. The lead chloride solution is then sent to a precipitation unit 64, where lime is added and lead hydroxychloride is precipitated. This product is further treated by sending it to a destabilization unit 65 as shown in FIG. 5 to prepare a chloride-reduced lead product, and then may be subjected to a drying stage unit 66. Alternatively, the solid exiting from unit 64 is filtered and then calcined in unit 67, as shown in FIG. 6. Although this apparatus has been described with reference to several separate units, it is within the scope of the present invention to add additional units to perform additional functions. In addition, it is possible to conduct multiple steps of the process in the same unit, such as using one precipitation unit for the iron precipitation, zinc dust cementation, and zinc oxide precipitation steps.

EXAMPLES

The present invention will now be described with reference to the following examples. It should be noted that although a complete process for producing zinc oxide from complex sulfide concentrates is described in the present application, the following examples will focus on the precipitation of zinc oxide.

Example 1

Tests were conducted at 95° C., 3 N HCl and 400 mV (versus Ag/AgCl) with a 150% HCl stoichiometry based on Zn, Pb, and Cu content, oxygen as oxidant, and 7 hour retention time. The lead and zinc content was varied in different proportions to simulate the behavior of various complex sulfide ores. Under those conditions, zinc was extracted at 95%–99%, lead was extracted at 98%–99%, silver was extracted at 80%–89%, and iron was extracted at 10%–18%. The results are shown in Table 1.

TABLE 1

Extraction of metals from complex sulfide ore by $HCl/FeCl_3/O_2$ leach

| Concentrate Composition | | Metal Extraction | | | |
|---|---|---|---|---|---|
| Pb % | Zn % | Zn % | Pb % | Ag % | Fe % |
| 6.6 | 14.6 | 99 | 99 | 80 | 10 |
| 6.9 | 24.9 | 97 | 98 | 88 | 15 |
| 13.6 | 15.6 | 97 | 99 | 80 | 10 |
| 14.1 | 25.8 | 95 | 99 | 89 | 18 |
| 11.3 | 20.5 | 96 | 99 | 86 | 11 |

Example 2

Three tests were conducted at pH 3.0, 3.5, and 4.0, in order to evaluate the efficiency of $Ca(OH)_2$ addition at different pH levels and the resulting quality of the purified solution produced. Iron precipitation takes place at 90° C.–95° C., a potential of about 300 mV(versus Ag/AgCl) without any ORP control, with oxygen addition for a duration of 120 minutes. The iron precipitate formed is an easily-filtered akaganeite (i.e., FeO(OH, Cl)). The results show that pH 3.0 is optimum for efficient iron precipitation, where zinc losses were 0.93%. (See Table 2 and Table 3). The iron neutralization can be carried out with zinc oxide ore. A zinc oxide containing 30% zinc was used to carry out the iron precipitation step at pH 3.0, with all other conditions remaining the same. The zinc extraction from the oxide ore was 90% where Fe concentration was lowered to approximately 0.32 mg/l. Therefore, a zinc oxide ore may be used to carry out this neutralization.

TABLE 2

Analysis of solids after iron neutralization

| | Cl % | Si % | Cu % | Pb % | Zn % |
|---|---|---|---|---|---|
| pH 3.0 | 1.89 | 0.58 | 1.07 | 9.63 | 0.93 |
| pH 3.5 | 2.03 | 0.69 | 4.14 | 12.8 | 2.34 |
| pH 4.0 | 1.45 | 0.60 | 6.89 | 13.0 | 5.42 |
| pH 3.0[1] | — | 3.17 | 0.73 | 4.21 | 3.81 |

[1]Use of Zn Oxide Ore for Iron Precipitation

TABLE 3

Solution concentrations after iron neutralization

| | Ag mg/L | Al mg/L | As mg/L | Fe mg/L | Sb mg/L |
|---|---|---|---|---|---|
| pH 3.0 | 27.0 | 1.79 | <1.00 | 0.12 | <1.00 |
| pH 3.5 | 0.45 | 0.50 | <1.00 | 0.05 | <1.00 |
| pH 4.0 | 0.45 | 0.50 | <1.00 | 0.05 | <1.00 |
| pH 3.0[1] | 6.00 | 4.07 | <1.00 | 0.32 | <1.00 |

[1]Use of Zn Oxide Ore for Iron Precipitation

Example 3

Cementation was conducted at pH 2.7, with agitation at a speed of 650 rpm, and a constant temperature of 90° C. The stoichiometric quantity of Zn added was based on the Cu, Pb, Cd, Ag and Co concentrations measured in the starting solution. The results shown in Table 4 indicate that Ag, Cu, and half of the Pb were removed with the Zn in an amount equivalent to 100% stoichiometry. At a stoichiometry of 200%, Pb, Cd, and some Co were removed, whereas at 300% most of the Co was also removed. Adjusting the zinc dosage leads to a cementation cake containing from 5% to 90% Ag.

TABLE 4

Metal Concentrations in the Cementation Feed Solution and in Filtrate after Cementation

| Stoich. | Ag | Cu | Pb | Cd | Ni | Tl | Co |
|---|---|---|---|---|---|---|---|
| HEAD | 40 | 1800 | 1400 | 130 | 8.4 | 10 | 14 |
| 100% | <1.0 | 0.46 | 745 | 107 | 6.1 | 3.5 | 13 |
| 200% | <1.0 | 0.24 | <1.0 | 0.26 | <0.20 | <1.0 | 4.2 |
| 300% | <1.0 | <0.10 | <1.0 | <0.10 | <0.20 | <1.0 | 1.0 |

Units (mg/l)

Example 4

Tests were carried out using a synthetic solution of 135 g/l of $CaCl_2$ with addition of an 82 g/L Zn (as $ZnCl_2$) solution and a neutralization suspension of 20 w/w % $Ca(OH)_2$. Zinc oxide seed was added at the rate of 100 g/L of initial calcium chloride solution. The precipitation was carried out by the static pH method. The precipitates produced in this example met the chlorine target levels of 0.1% or less. Table 5 shows the results for static pH precipitation using a well-slaked suspension of reagent grade $Ca(OH)_2$ as the neutralizing agent. The test was performed at 95° C., and pH of 9.0, and resulted in a ZnO precipitate with 0.016% Cl after 30 minutes retention time, and 0.0224% Cl after 60 minutes retention time.

TABLE 5

Results of Static pH Precipitation

| Conditions | Solution | | | Zn Precipitate | | | |
|---|---|---|---|---|---|---|---|
| Time (min) | Ca (mg/l) | SO$_4$ (mg/l) | Zn (mg/l) | SO$_4$ % | Cl % | Ca % | Zn % |
| (feed of ZnCl2) | 1146 | 3494 | 82065 | <0.007 | 0.0067 | <0.0075 | 73.28 |
| 30 | 39288 | 2103 | 15.8 | 0.22 | 0.0160 | 0.34 | 72.88 |
| 60 | 38948 | 1915 | 4.8 | 0.53 | 0.0224 | 0.34 | 69.69 |

Example 5

Several tests were carried out to dissolve zinc oxide in a industrial spent zinc electrolyte (40–50 g/L Zn, 180–210 g/L $H_2SO_4$). Dissolution is rapid (less than 10 minutes is required) and can be carried out easily even at room temperature. An increase in the zinc content in solution from 57 g/l to 100 g/l resulted in an increase in the solution temperature of about 15° C. It may be preferable to further increase the zinc content of the solution (e.g., to 130 g/l), in order to further consume acid present in the solution and enable it to be fed directly to a cementation circuit (see FIG. 3). Results are shown in Table 6.

TABLE 6

Results for Dissolution of Zinc Oxide in Zinc Electrolyte

| Type of solution | [Mg] (g/l) | [Mn] (g/l) | [Zn] ini (g/l) | [Zn] f (g/l) | [Zn] added (g/l) | Time to dissolve (sec) | Temperature increase (° C.) |
|---|---|---|---|---|---|---|---|
| synthetic | | | 57.2 | 99 | 41.5 | 899 | 14.1 |
| synthetic | | | 61.5 | 111 | 49.5 | 490 | 15.1 |
| synthetic | 12.0 | 3.93 | 58.9 | 105 | 46.3 | 793 | 16.1 |
| Zn electrolyte | | | 46.4 | 56 | 9.10 | 393 | 2.5 |
| Zn electrolyte | | | 46.6 | 55 | 8.10 | 466 | 3.1 |
| Zn electrolyte | | | 46.7 | 93 | 46.2 | 496 | 15 |

Example 6

The leach residue from the hydrochloric acid leach is subjected to a mild leach with calcium chloride solution or other chloride salt solution to solubilize the remaining lead chloride and recover it. The leach was carried out at a temperature varying from 45° C. to 95° C., over the course of one hour. The results, as shown in Table 7, indicate a higher solubility of lead as the calcium chloride content is increased. At 95° C. and $CaCl_2$ of 6 N, the lead solubility is 41 g/L.

TABLE 7

Results of lead chloride leach

| Temperature ° C. | CaCl$_2$ at 3.0 N g/L | CaCl$_2$ at 6.0 N g/L | HCl at 3.0 N g/L |
|---|---|---|---|
| 45 | 4.10 | 17.2 | 2.80 |
| 70 | 8.37 | 19.0 | 5.76 |
| 95 | 16.1 | 41.2 | 9.23 |

Example 7

A lead chloride solution was neutralized with $Ca(OH)_2$ at 60° C. and pH 8.0 for one hour. The product contained 13% Cl, which corresponds to the lead hydroxychloride Pb(OH)Cl. This product was subjected to a destabilization step in which the product is put in water at 95° C. with the pH adjusted to 9.5 for one hour. This treatment succeeded in bringing the chloride content from 13% to 4.5%. Results are shown in Table 8.

TABLE 8

Lead Solid Content After Precipitation and Destabilization

| | Ca % | Cl % | Pb % |
|---|---|---|---|
| Precipitation | 0.29 | 13.0 | 74.0 |
| Destabilization | 0.59 | 4.46 | 82.6 |

Example 8

The exhausted solution from the zinc oxide precipitation is sent to a Hydrochloric Acid Regeneration unit to recover hydrochloric acid starting from a solution of calcium chloride. Normally, this solution is very pure and contains only calcium chloride. Concentrated sulfuric acid (96%–98%) is added to the calcium chloride solution. After 30 minutes, the calcium content in solution was brought down from 31,500 mg/L to 900 mg/L. Calcium is most likely to precipitate as gypsum. Table 9 shows the results obtained for hydrochloric acid regeneration.

TABLE 9

Acid Regeneration Results

| | TIME Minute | Ca mg/L | $SO_4$ mg/L | Zn mg/L | Cl mg/L |
|---|---|---|---|---|---|
| FEED (1) | | 31500 | 142 | 58.9 | |
| Filtrate | 30 | 2490 | 29400 | 205.0 | |
| Final Filtrate | | 3000 | 29200 | 179 | |
| Wash | | 902 | 4660 | 20.7 | |
| | | % | % | % | % |
| Residue | 30 | 21.9 | 55.9 | | <0.01 |
| Final Residue | | 22.0 | 55.1 | | <0.01 |

While the present invention has been described for what are presently considered the preferred embodiments, the invention is not so limited. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

We claim:

1. A process for producing zinc oxide from a zinc-bearing material, comprising the steps of:
   leaching the zinc-bearing material with hydrochloric acid, ferric chloride and oxygen, the leaching producing a leach solution and a leach residue, the leach residue containing lead chloride;
   removing the leach residue;
   precipitating iron from the leach solution using lime, the precipitating of iron producing an iron precipitation solution;
   recovering copper, silver, cadmium, cobalt and lead from the leach solution by cementation with zinc dust;
   precipitating zinc oxide from the leach solution using lime, the precipitating of zinc oxide producing a residual calcium chloride solution;
   recovering lead contained in the leach residue by solubilizing the lead chloride and precipitating lead hydroxychloride from the solubilized lead chloride using lime; and
   regenerating hydrochloric acid and precipitating gypsum from the residual calcium chloride solution.

2. The process of claim 1, further comprising the step of drying the zinc oxide precipitate.

3. The process of claim 1, further comprising the steps of re-dissolving the zinc oxide precipitate, purifying the zinc oxide precipitate with zinc dust, and zinc sulfate electrowinning of the zinc oxide precipitate.

4. The process of claim 1, further comprising the step of removing additional trace elements from the solution during cementation.

5. The process of claim 1, wherein the leach solution has a temperature in the range of approximately 50° C. to 150° C.

6. The process of claim 1, wherein the leach solution has a pH of 1 or lower.

7. The process of claim 1, wherein the zinc oxide precipitate has a chloride content of less than 0.1% by weight.

8. The process of claim 1, wherein at least 90% by weight of the zinc originally contained in the zinc-bearing material is extracted from the zinc-bearing material.

9. The process of claim 1, wherein the zinc-bearing material is a complex sulfide material.

10. The process of claim 9, wherein sulfur occurring in the sulfide form and present in the complex sulfide material is transformed into elemental sulfur.

11. The process of claim 1, wherein the zinc-bearing material is EAF dust.

12. The process of claim 1, wherein the zinc-bearing material is BOF dust.

13. The process of claim 1, wherein the zinc-bearing material is a ferrite.

14. The process of claim 1, wherein the step of recovering copper, silver, cadmium, cobalt and lead from the leach solution by cementation with zinc dust comprises two or more separate cementations.

15. The process of claim 1, the step of leaching being executed as a single step by providing all of the hydrochloric acid at one time.

16. The process of claim 1, the step of leaching being executed continuously by providing the hydrochloric acid at several points in time.

17. The process of claim 1 wherein, during the step of leaching, oxygen is used as an oxidant.

18. The process of claim 1 wherein, during the step of leaching, air is used as an oxidant.

19. The process of claim 1 wherein the leaching step is conducted countercurrently.

20. A process for producing zinc oxide from a zinc-bearing material as in claim 1, wherein solubilizing the lead chloride comprises solubilizing the lead chloride using water as a solvent.

21. A process for producing zinc oxide from a zinc-bearing material as in claim 1, wherein solubilizing the lead chloride comprises solubilizing the lead chloride using a solvent having a high chloride content.

22. A process for producing zinc oxide from a zinc-bearing material as in claim 1, wherein the lead recovered in the step of recovering lead is crystallized for recovery at a lead refinery.

23. A process for producing zinc oxide from a zinc-bearing material as in claim 1, wherein in the step of recovering lead, precipitating the solubilized lead chloride with lime produces a lead hydroxychloride.

24. A process for producing zinc oxide from a zinc-bearing material as in claim 23, further comprising the step of destabilizing the lead hydroxychloride by dissolving the lead hydroxychloride into a high temperature solution having a Ph of at least 9.

25. A process for producing zinc oxide from a zinc-bearing material as in claim 23, further comprising the step of subjecting the lead hydroxychloride to calcination.

26. A process for producing zinc oxide from a zinc-bearing material as in claim 23, further comprising the step of drying the lead hydroxychloride product.

27. A process for producing zinc oxide from a zinc-bearing material as in claim 1, wherein the step of recovering copper, silver, cadmium, cobalt and lead from the leach solution by cementation with zinc dust comprises two or more separate cementations.

28. A process for producing zinc oxide from a zinc-bearing material, comprising the steps of:
   leaching the zinc-bearing material with hydrochloric acid, ferric chloride and oxygen, the leaching producing a leach solution and a leach residue, the leach residue containing lead chloride;
   removing the leach residue;
   precipitating iron from the leach solution using a material selected from the group of EAF dust, BOF dust, or ferrite, the precipitating of iron producing an iron precipitation solution;

recovering copper, silver, cadmium, cobalt and lead from the leach solution by cementation with zinc dust;

precipitating zinc oxide from the leach solution using lime, the precipitating of zinc oxide producing a residual calcium chloride solution;

recovering lead contained in the leach residue by solubilizing the lead chloride and precipitating lead hydroxychloride from the solubilized lead chloride using lime; and regenerating hydrochloric acid and precipitating gypsum from the residual calcium chloride solution.

29. A process for producing zinc oxide from a zinc-bearing material, comprising the steps of:

leaching the zinc-bearing material with hydrochloric acid, ferric chloride and oxygen, the leaching producing a leach solution and a leach residue, the leach residue containing lead chloride;

removing the leach residue;

precipitating iron from the leach solution using a zinc oxide ore, the precipitating of iron producing an iron precipitation solution;

recovering copper, silver, cadmium, cobalt and lead from the leach solution by cementation with zinc dust;

precipitating zinc oxide from the leach solution using lime, the precipitating of zinc oxide producing a residual calcium chloride solution;

recovering lead contained in the leach residue by solubilizing the lead chloride and precipitating lead hydroxychloride from the solubilized lead chloride using lime; and regenerating hydrochloric acid and precipitating gypsum from the residual calcium chloride solution.

\* \* \* \* \*